Aug. 29, 1950  M. H. HOLLINGSWORTH  2,520,406
SHOCK ABSORBER
Filed Jan. 16, 1948  2 Sheets-Sheet 1
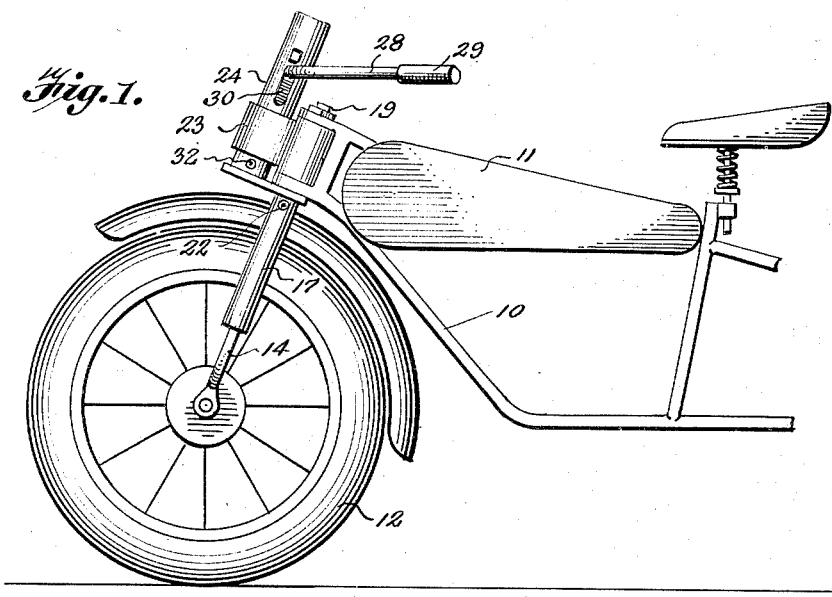
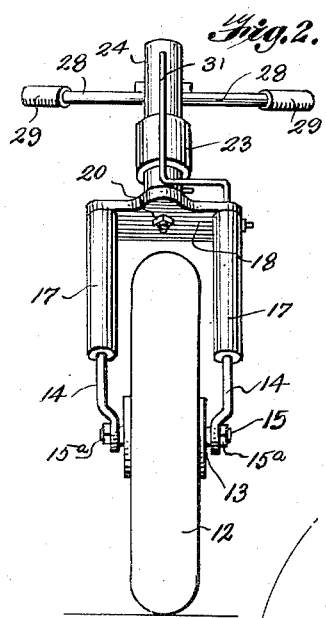
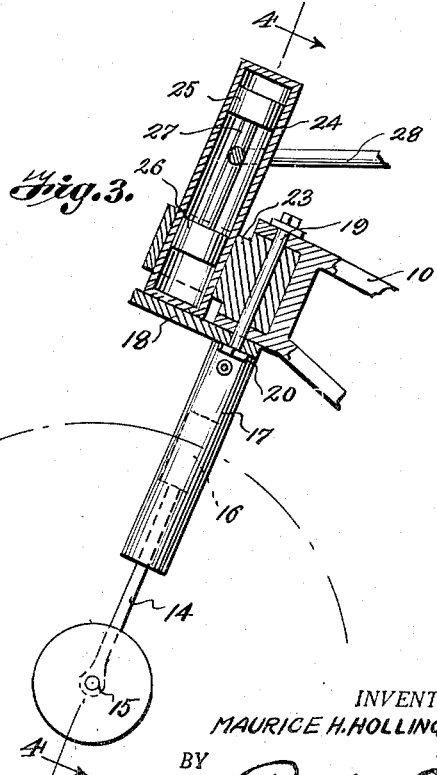
INVENTOR.
MAURICE H. HOLLINGSWORTH
BY
Patrick D Beavers.
ATTORNEY

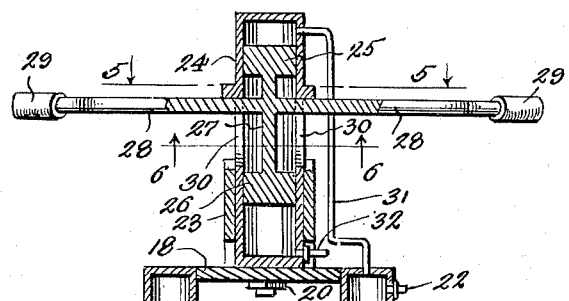
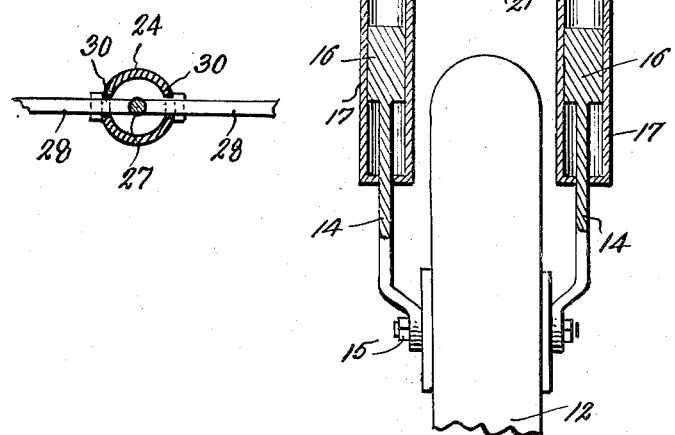
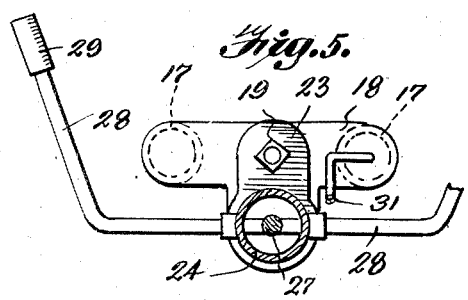

Patented Aug. 29, 1950

2,520,406

UNITED STATES PATENT OFFICE 2,520,406

SHOCK ABSORBER

Maurice H. Hollingsworth, Corpus Christi, Tex.

Application January 16, 1948, Serial No. 2,771

2 Claims. (Cl. 280—277)

The present invention relates to shock absorbers and it consists in the combinations, constructions and arrangements of parts herein described and claimed and is of the general character of the invention shown in my copending application, Serial No. 594,502, filed May 18, 1945, and which issued as United States Patent No. 2,467,478.

It is an object of the present invention to provide novel means and mechanism for absorbing shocks which may be imparted to the front wheel of a motorcycle or wheel of like character.

A further object of the invention is the provision of a novel application of fluid pressure in a shock absorbing mechanism for the transference of forces from one part thereof to another.

Another object of the invention is the provision of novel means and mechanism whereby the handlebars of a motorcycle may be maintained in substantially a normal plane regardless of the surface conditions encountered over a road over which a motorcycle may be traveled.

A further object of the invention is the provision of a novel fork construction for the front wheel of a motorcycle.

A still further object of the invention is the provision of a novel mounting for the handlebars of a motorcycle.

Another object of the invention is the provision of novel means for storing pressure in a shock absorbing system for motorcycles.

Other and further objects of the invention will become apparent from a reading of the following specification taken in conjunction with the drawings, in which:

Figure 1 is a fragmentary side elevational view of a motorcycle having an embodiment of the invention encompassed therein, Figure 2 is a front elevational view of Figure 1, Figure 3 is an enlarged fragmentary elevational view, partly in section, disclosing certain details of the invention, Figure 4 is a sectional view taken along line 4—4 of Figure 3, Figure 5 is a sectional view taken along line 5—5 of Figure 4, and Figure 6 is a fragmentary sectional view taken along line 6—6 of Figure 4 in the direction of the arrows shown therein.

Generally there is provided a shock absorbing mechanism particularly adapted to the front wheel of a motorcycle and in which means is provided for transferring any upward movement of the axle of the front wheel to a downward movement of the handlebars whereby the latter may be maintained continuously at substantially the same distance from the ground. Likewise, any downward movement of the front wheel, due to the same encountering depressions in the roadway over which the motorcycle may be proceeding, may be automatically transferred into a corresponding upward movement of the handlebars to likewise maintain the same in their proper normal plane with respect to the ground. To accomplish this pistons connected with the axle are mounted within the cylinders which are in turn connected with a cylinder in which a pair of pistons is mounted and which pair of pistons carry the outwardly extending arms of the handlebars of the motorcycle. Means is provided for maintaining pressure below the pair of pistons connected with the handlebars and means is also provided for maintaining pressure above the pistons connected with the axle.

Referring more particularly to the drawings, there is shown therein a motorcycle having a frame 10, the conventional gasoline tank 11 and a front wheel 12. The front wheel is provided with an axle 13 to either end of which is connected an upwardly extending fork member 14 by means of a bolt 15 and nuts 15a.

Formed at the upper ends of the fork members 14 in each case is a piston 16 which is slidably mounted in a cylinder 17 in each case. The upper ends of the cylinders 17 are interconnected by a horizontally extending plate 18 through which the lower end of a steering axle 19 protrudes and which is provided with a head 20 at its lower end. A tubular passage 21 interconnects the interiors of the upper ends of the cylinders 17 and one of the cylinders 17 is provided with a valved inlet 22 at its upper end.

Pivotally mounted upon the axle 19 is a forwardly extending bracket 23 in which is affixed an upwardly extending cylinder 24. Within the cylinder 24 there is mounted an upper piston 25 and a lower piston 26 which are interconnected by means of a vertical rod 27 to which is integrally connected a pair of outwardly extending handlebars 28 terminating in the conventional grips 29. The handlebars 28 extend through openings 30 formed in the sides of the cylinder 24. A tubular member 31 interconnects the upper end of the cylinder 24 and the upper end of one of the cylinders 17. An inlet valve 32 is provided at the lower end of the cylinder 24.

In the operation of the invention it will be apparent that air under pressure is first introduced through valves 22 and 32 and that thereafter, when the wheel 12 encounters normal bumps in the highway, that the normal resiliency of the pneumatic tire of the wheel will absorb the same. In this case, that is to say in the case of small or normal obstacles and indentations in the roadway, the frame of the motorcycle and the handlebars will remain in their normal positions. This lack of movement on the part of frame and handlebars is accentuated due to the fact that the weight of the motorcycle resting on the front wheel causes an inertia and a resistance to movement which, in turn, causes such normal deficiencies in the road surface and their resultant shocks to be absorbed by the tires. The present invention comes into action in the case of extra heavy shocks caused by unusually elevated obstacles or unusually large depressions in the highway.

By referring to Figure 4, it will be noted that the pistons 16 and, of course, the wheel axle 15 are never still when the motorcycle is in motion and that they will travel upwardly and downwardly in such normal operation from one inch to three or four inches continuously when the shocks are too great for the pneumatic tire itself to absorb the same. It would naturally be most uncomfortable if such motion were imparted to the handlebars and it is to be understood that the principal operation of the present invention becomes effective only when unusually severe shocks are imparted to the motorcycle. When this occurs the pistons 16 will have traveled upwardly a greater than usual distance thereby causing the air pressure in the cylinders 17 above the pistons 16 to become greatly increased. This great increase in pressure is now sufficient to cause a downward movement of the pistons 25 and 26 due to overcoming the maintained air pressure in the lower portion of the cylinder 24 below the piston 26.

The principle set forth in the present application might well be applied to the action of the saddle of the motorcycle as well as the handlebars by attaching the apparatus shown herein to the rear wheel axle and the saddle instead of the front wheel axle and the handlebars.

While but one form of the invention has been shown and described herein, it will be readily apparent to those skilled in the art that many minor modifications may be made without departing from the spirit of the invention or the scope of the appended claims.

What is claimed is:

1. A shock absorber of the character described comprising a vehicle frame, a vehicle wheel, an axle for the wheel, a pair of fork members carried by said axle, a piston at the upper end of each fork member, a cylinder for each of said pistons, a tube interconnecting the upper ends of the cylinders, a compression chamber carried by the frame and divided into upper and lower compartments, a piston slidably mounted in each of said compartments, a rod interconnecting said last two mentioned pistons, handle bars connected with said rod and a tube interconnecting the upper compartment and the upper end of one of the cylinders.

2. A shock absorber of the character described comprising a vehicle frame, a vehicle wheel, an axle for the wheel, a pair of fork members carried by said axle, a piston at the upper end of each fork member, a cylinder for each of said pistons, a tube interconnecting the upper ends of the cylinders, a compression chamber carried by the frame and divided into upper and lower compartments, a piston slidably mounted in each of said compartments, a rod interconnecting said last two mentioned pistons, handle bars connected with said rod, a tube interconnecting the upper compartment and the upper end of one of the cylinders, an inlet valve at the upper end of one of the cylinders and an inlet valve in the lower compartment.

MAURICE H. HOLLINGSWORTH.

REFERENCES CITED

The following references are of record in the file of this patent:

FOREIGN PATENTS

| Number | Country | Date |
| --- | --- | --- |
| 56,956 | Denmark | Nov. 20, 1939 |